(12) United States Patent
Saxena et al.

(10) Patent No.: US 12,313,127 B2
(45) Date of Patent: May 27, 2025

(54) CLUTCH DEVICE

(71) Applicant: BorgWarner Inc., Auburn Hills, MI (US)

(72) Inventors: Viren Narendra Saxena, Mannheim (DE); Christopher Anton Stein, Walldorf (DE); Matthias Gerhard Veit, Oftersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/358,556

(22) Filed: Jul. 25, 2023

(65) Prior Publication Data

US 2024/0035526 A1 Feb. 1, 2024

(30) Foreign Application Priority Data

Jul. 30, 2022 (DE) .......................... 102022002776.3

(51) Int. Cl.
*F16D 13/52* (2006.01)
*F16D 13/62* (2006.01)
(Continued)

(52) U.S. Cl.
CPC ............. *F16D 13/52* (2013.01); *F16D 13/62* (2013.01); *F16D 13/70* (2013.01); *F16D 13/74* (2013.01);
(Continued)

(58) Field of Classification Search
CPC ............ F16D 21/06; F16D 2021/0661; F16D 2021/0676; F16D 13/52; F16D 13/70;
(Continued)

(56) References Cited

U.S. PATENT DOCUMENTS

2015/0083546 A1* 3/2015 Moser .................... F16D 13/52
 192/41 R
2015/0226273 A1* 8/2015 Trent ..................... F16D 13/70
 192/48.8

FOREIGN PATENT DOCUMENTS

DE 102007045588 A1 4/2008
DE 102007022422 A1 11/2008
(Continued)

OTHER PUBLICATIONS

English language abstract and machine-assisted English translation for DE 10 2007 045 588 A1 extracted from espacenet.com database on Jun. 25, 2024, 17 pages.
(Continued)

*Primary Examiner* — Richard M Lorence
(74) *Attorney, Agent, or Firm* — Howard & Howard Attorneys PLLC

(57) ABSTRACT

A clutch device includes a wet-running multiple disc clutch that has a first multiple disc carrier, a second multiple disc carrier, and a multiple disc pack assigned to the first and second multiple disc carrier. The clutch device further includes a first power transmission element on a first axial side of a wall facing away from the multiple disc pack, and a second power transmission element on a second axial side of the wall facing the multiple disc pack for applying an operating power to the multiple disc pack. The second power transmission element has an application section and operating fingers that extend through recesses in the wall to interact with the first power transmission element on the first axial side. The application section protrudes inward in the radial direction over the operating fingers.

19 Claims, 1 Drawing Sheet

(51) Int. Cl.
*F16D 13/70* (2006.01)
*F16D 13/74* (2006.01)
*F16D 21/06* (2006.01)

(52) U.S. Cl.
CPC ...... *F16D 21/06* (2013.01); *F16D 2021/0676* (2013.01)

(58) Field of Classification Search
CPC ...... F16D 13/72; F16D 13/74; F16D 25/0638; F16D 25/082; F16D 25/10; F16D 23/12; F16D 13/62
USPC .................................................. 192/48.619
See application file for complete search history.

(56) References Cited

FOREIGN PATENT DOCUMENTS

| | | |
|---|---|---|
| DE | 102011113278 A1 | 3/2013 |
| DE | 102018113945 B3 | 9/2019 |
| EP | 2469114 A1 * | 6/2012 ............. F16D 13/70 |

OTHER PUBLICATIONS

English language abstract and machine-assisted English translation for DE 10 2011 113 278 A1 extracted from espacenet.com database on Jun. 25, 2024, 21 pages.

Machine-assisted English language abstract and machine-assisted English translation for DE 10 2018 113 945 B3 extracted from espacenet.com database on Jun. 25, 2024, 14 pages.

* cited by examiner

CLUTCH DEVICE

CROSS-REFERENCE TO RELATED APPLICATIONS

This application claims priority pursuant to 35 U.S.C. § 119(a) to German Application No. 102022002776.3, filed Jul. 30, 2022, which application is incorporated herein by reference in its entirety.

BACKGROUND

The present invention relates to a clutch device having a wet-running multiple disc clutch that has a first multiple disc carrier, a second multiple disc carrier and a multiple disc pack assigned to the first and second multiple disc carrier, a first power transmission element on a first axial side of a wall facing away from the multiple disc pack and a second power transmission element on a second axial side of the wall facing the multiple disc pack for applying an operating power to the multiple disc pack, wherein the second power transmission element has an application section and operating fingers that extend through recesses in the wall to interact with the first power transmission element on the first axial side.

A clutch device in the form of a concentric dual clutch device is known from DE 10 2007 022 422 A1, having two wet-running multiple disc clutches, specifically a radial outer multiple disc clutch and a radial inner multiple disc clutch. The radial outer multiple disc clutch has an outer multiple disc carrier, an inner multiple disc carrier and a multiple disc pack assigned to the outer and inner multiple disc clutch. Two power transmission elements for applying an operating power to the multiple disc pack are assigned to the multiple disc pack. The known clutch device thus has a first power transmission element on a first axial side of a wall facing away from the multiple disc pack, wherein the wall is formed by a radial section of the outer multiple disc carrier. The clutch device additionally has a second power transmission element arranged on a second axial side of this wall facing the multiple disc pack so that power can be applied to the multiple disc pack. The second power transmission element has an application section and operating fingers formed as one part with one another. The operating fingers of the second power transmission element extending substantially in the axial direction extend through recesses in the wall to be able to interact with the first power transmission element on the first axial side. DE 10 2007 022 422 A1 suggests permanently fixedly connecting the ends of the operating fingers facing the first power transmission element to the first power transmission element, for example by means of welding. The application section of the second power transmission element, via which the operating power can be directly applied to the multiple disc pack, is substantially designed in the shape of an annular disc, wherein the application section extends outward in the radial direction starting from the operating fingers extending substantially in the axial direction.

The known clutch devices are tried and tested, but require improvement in that higher temperatures can occur in the multiple disc pack or on the discs of the multiple disc pack, which can cause increased wear, and thus a reduced lifespan of the multiple disc clutch within the clutch device.

It is thus an object of the present invention to further develop a conventional clutch device such that it is exposed to a lower temperature-dependent wear, and thus has a higher lifespan.

DESCRIPTION

This object is achieved by the features specified in claim 1. Advantageous embodiments of the invention are the subject matter of the dependent claims.

The clutch device according to the invention is preferably a clutch device within the drive train of a motor vehicle, and has at least one wet-running multiple disc clutch and thus a multiple disc clutch that is cooled and lubricated by means of a liquid. The clutch device is preferably a dual clutch device, in particular preferably a concentric dual clutch device where two multiple disc clutches are arranged radially nested. The wet-running multiple disc clutch of the clutch device has a first multiple disc carrier, a second multiple disc carrier and a multiple disc pack assigned to the first and second multiple disc carrier. The first multiple disc carrier can be, for example, an outer or inner multiple disc carrier, while the second multiple disc carrier can be, for example, an inner or outer multiple disc carrier. The multiple disc pack is a combination of inner and outer discs that are in a rotary drive connection with the inner or, respectively, outer multiple disc carrier. Two power transmission elements are further assigned to the multiple disc pack, said power transmission elements serving to apply an operating power to the multiple disc pack, wherein the two power transmission elements can preferably be shifted in the axial direction for this purpose. It has additionally proved advantageous if the two power transmission elements can be driven hydraulically, for example via a hydraulic piston-cylinder arrangement. The multiple disc clutch can be a normally closed multiple disc clutch or a normally open multiple disc clutch, wherein the latter is preferred. The first power transmission element of the two specified power transmission elements is arranged on a first axial side of a wall facing away from the multiple disc pack. The wall is preferably a section extending in the radial direction or a radial supporting section of a multiple disc carrier of the clutch device, preferably a radial section of the first multiple disc carrier. On the other hand, the second power transmission element is arranged on a second axial side of this wall facing the multiple disc pack so that it can apply the operating power to the multiple disc pack. The second power transmission element thus preferably has an annular-disc-shaped application section and operating fingers, wherein the operating fingers preferably extend substantially in the axial direction and can thus be described as axial fingers. To be able to connect the first power transmission element with the second power transmission element, so that the operating power can be transmitted from the first axial side of the wall to the second axial side of the wall, and thus to the multiple disc pack, the operating fingers extend through recesses in the wall to interact with the first power transmission element on the first axial side, preferably to be or to be able to be supported on the first power transmission element in the axial direction. Both the first power transmission element and the second power transmission element are preferably designed as a sheet metal part or as a shaped sheet metal part, additionally in particular preferably respectively as a one-part element. Unlike the operating section of the second power transmission element known from DE 10 2007 022 422 A1, in the clutch device according to the invention, the application section of the second power transmission element is connected to the operating fingers such that the application section protrudes inward in the radial direction over the operating fingers. If a liquid of the wet-running multiple disc clutch flows outward in the radial direction between the application section pulled inward in the radial direction and the multiple disc pack, the application section pulled inward prevents the liquid from being able to flow in the axial direction to the recesses in the wall in this region and to exit via these recesses without generating a cooling or lubricating effect in the multiple disc pack. The application section protruding inward in the radial direction over the operating fingers also causes the liquid to be held back early and at least partially in the multiple disc pack, which can thus be more effectively cooled and lubricated, which ultimately leads to lower wear on the discs of the multiple disc pack and thus to an increased lifespan of the clutch device.

To guide the liquid flowing outward in the radial direction in the clutch device into the region of the multiple disc pack to cool and/or lubricate the multiple disc pack particularly early and to be able to hold it back there, in a preferred embodiment of the clutch device according to the invention, the application section extends inward in the radial direction at least up to an inner diameter of at least one outer disc of the multiple disc pack or over the inner diameter of the at least one outer disc. The at least one outer disc of the multiple disc pack is preferably an end disc of the multiple disc pack facing the second power transmission element, which can also be designed as a so-called pressure or pressing disc, but fundamentally has the function of an outer disc, specifically producing a friction connection with a neighboring inner disc.

To generate an even more effective application of the multiple disc pack with the liquid of the wet-running multiple disc clutch flowing outward in the radial direction, in a further preferred embodiment of the clutch device according to the invention, the application section extends at least up to an outer diameter of a multiple disc carrier section of the second multiple disc carrier for inner discs of the multiple disc pack or further inward in the radial direction. In this region, it is thus already prevented that the liquid can flow in the axial direction and can reach behind the application section, where it could exit through the recesses in the wall and could thus be removed from the cooling of the multiple disc pack. So that this can be prevented even more reliably, in this embodiment it is further preferred if the application section extends inward in the radial direction at least up to a gearing foot diameter of a gearing of the multiple disc carrier section of the second multiple disc carrier for inner discs of the multiple disc pack or further, in particular preferably at least up to an inner diameter of the multiple disc carrier section of the second multiple disc carrier or further.

As already indicated in the introduction, the clutch device is preferably a dual clutch device having multiple disc clutches arranged concentrically to one another. Against this background, in a particularly preferred embodiment of the clutch device according to the invention with radial ledges on the application section, the application section extends into a gearing on a multiple disc carrier section of a second multiple disc clutch of the clutch device arranged nested with the first-specified multiple disc clutch in the radial direction. The specified multiple disc carrier section of the second multiple disc clutch is preferably the multiple disc carrier section of an outer multiple disc carrier of the second multiple disc clutch. The multiple disc carrier section of the second multiple disc clutch is also preferably designed as a tube, wherein the gearing is formed from an outer gearing on the tubular multiple disc carrier section. In this embodiment, it is additionally preferred if the outer gearing is designed as one part with an inner gearing for outer discs of the second multiple disc clutch on the tubular multiple disc carrier section of the second multiple disc clutch. In this embodiment, the tubular multiple disc carrier section is thus deformed such that the outer gearing and the inner gearing are formed by the same component, just on sides facing away from one another. Regardless of the advantages on the production side, in this embodiment it is advantageous that the liquid flowing within such a gearing or outer gearing is also prevented by the radial ledges of the application section from flowing in the axial direction behind the application section to then flow outward in the radial direction and through the recess in the wall and thus reducing the cooling effect for the multiple disc pack of the multiple disc clutch. Contrastingly, a particularly strong cooling effect is generated for the multiple disc pack via the so-called holding back, especially because the liquid can largely be guided to the multiple disc pack in a targeted manner.

According to a further particularly preferred embodiment of the clutch device according to the invention, the radial ledges on the application section serve not only to hold back the liquid, and instead the radial ledges extend into the gearing on the multiple disc carrier section of the second multiple disc clutch while generating an indirect rotary drive connection between the wall and the second power transmission element. This has the advantage that the operating fingers of the second power transmission element can be relieved of load, especially because the operating fingers do not or do not completely have to serve the rotary drive connection between the second power transmission element and the wall. In this embodiment, it is thus preferred if the rotary drive connection is made via the radial ledges of the application section, on the one hand, and the gearing on the multiple disc carrier section of the second multiple disc clutch, on the other hand, with a permanent spacing of the operating fingers in the circumferential direction from an edge of the recesses in the wall, so that the operating fingers no longer have to abut or lie against the specified edge of the recesses in the circumferential direction.

So the liquid for the wet-running multiple disc clutch can be guided into the region of the multiple disc pack even more effectively and held back there, in a further preferred embodiment of the clutch device according to the invention, the application section has a rear radial section set back in the radial direction in relation to a front radial section of the application section. The rear radial section is preferably set back in relation to the front radial section such that the rear radial section has a larger spacing in relation to the multiple disc pack in the axial direction than is the case for the front radial section of the application section. In the simplest case, setting back the rear radial section can be understood as merely setting back the side of the rear radial section facing the multiple disc pack in relation to the side of the front radial section facing the multiple disc pack. Setting back the rear radial section can however also comprise an embodiment in which both the side of the rear radial section facing the multiple disc pack and the side of the rear radial section facing away from the multiple disc pack is set back in the axial direction in relation to the side of the front radial section facing the multiple disc pack or in relation to the side of the front radial section facing away from the multiple disc pack.

In an advantageous embodiment of the clutch device according to the invention, the rear radial section of the application section is arranged flush with the multiple disc carrier section of the second multiple disc carrier in the axial direction. In addition to the previously mentioned advantage of particularly effective guidance and holding back of the liquid, this has the advantage that the application section or the second power transmission element can be pushed particularly far in the direction of the multiple disc pack without the danger arising of a collision between the multiple disc carrier section of the second multiple disc carrier and the application section of the second power transmission element. A particularly compact structure can also be generated.

According to a further advantageous embodiment of the clutch device according to the invention, the rear radial section of the application section is arranged further inward in the radial direction than the front radial section to hold back a majority of the liquid for the wet-running multiple disc clutch and to be able to guide the latter to the multiple disc pack.

According to a further advantageous embodiment of the clutch device according to the invention, the front radial section of the application section is designed protruding or domed in the direction of the multiple disc pack so that the operating power can be applied to the multiple disc pack in a manner targeted over a radius and to enable the second power transmission element to be easily produced.

In theory, the second power transmission element could also be formed such that the application section additionally protrudes outward in the radial direction over the operating fingers, but to ensure a particularly simple structure of the second power transmission element, which additionally guarantees easy manufacturing of the same, in a further advantageous embodiment of the clutch device according to the invention, the application section does not extend outward in the radial direction over the operating fingers.

In a further exemplary embodiment of the clutch device according to the invention, it has proved advantageous with regard to stability if the operating fingers of the second power transmission element are arranged completely flush with the application section of the second power transmission element in the axial direction.

According to a further preferred embodiment of the clutch device according to the invention, the application section is arranged flush with clearances in the axial direction, said clearances being designed between the operating fingers of the second power transmission element in the circumferential direction. If the application section is arranged at least partially flush with the clearances in the axial direction, then the liquid is effectively kept in the region of the multiple disc pack. In this embodiment, it is preferred if the application section completely covers the clearances in the axial direction to ensure particularly good cooling and lubrication of the multiple disc pack without the liquid escaping too quickly as it flows around the application section and can escape through the clearances and the recesses in the wall.

In a further advantageous embodiment of the clutch device according to the invention, the recesses in the wall and/or the operating fingers, preferably all the recesses in the wall and/or all the operating fingers, are arranged flush, particularly preferably completely, with the multiple disc pack in the axial direction.

According to a further advantageous embodiment of the clutch device according to the invention, the application section of the second power transmission element is designed in a continuous course in the circumferential direction, preferably in an annular or annular disc shape.

In a further preferred embodiment of the clutch device according to the invention, the first multiple disc carrier has a supporting section extending in the radial direction that forms the wall in which the recesses for the operating fingers are provided.

In a further preferred embodiment of the clutch device according to the invention, the wall in which the recesses for the operating fingers are provided are formed from a wall connecting the first multiple disc carrier to the multiple disc carrier of the second multiple disc clutch. The wall connecting the first and second multiple disc carrier to one another can thus for example be a supporting section for the multiple disc carrier of the second multiple disc clutch, via which the multiple disc carrier of the second multiple disc clutch is supported in the radial direction on the first multiple disc carrier of the first multiple disc clutch.

In a further preferred embodiment of the clutch device according to the invention, the operating fingers and the application section are designed as one part with one another. Here it is preferred if the operating fingers and the application section are designed as a one-part sheet metal part to guarantee particularly simple manufacturing.

Although the operating fingers of the second power transmission element could theoretically be permanently fixed to the first power transmission element, it has proved advantageous if the operating fingers are or can be releasably supported on the first power transmission element to make manufacturing particularly simple. It is thus unnecessary to weld the operating fingers of the second power transmission element to the first power transmission element, whereby a deformation of the components caused by heat input can be safely prevented.

According to a further advantageous embodiment of the clutch device according to the invention, a return spring is provided for returning the first power transmission element to the first axial side. The at least one return spring is preferably arranged between the wall and the first power transmission element in the axial direction and respectively supported on the latter in the axial direction. It is here preferred if the return spring is designed as a disc spring.

In a further particularly preferred embodiment of the clutch device according to the invention, the return spring designed as a disc spring is or is able to be supported in the radial direction on the operating fingers of the second power transmission element while centering the same. This has the advantage that the first power transmission element would not have to have a continuous collar via which the disc spring could be centered, and instead the operating fingers already present and substantially extending in the axial direction are used for centering, whereby the design and the manufacturing is simplified.

Regardless of this as an alternative to the preceding embodiment, in a further advantageous embodiment of the clutch device according to the invention, the return spring designed as a disc spring can be or is supported on the first power transmission element in the radial direction while centering the same.

BRIEF DESCRIPTION OF THE DRAWINGS

The invention is explained in more detail below using exemplary embodiments with reference to the attached drawings. In the drawings.

DETAILED DESCRIPTION

Figure 1:
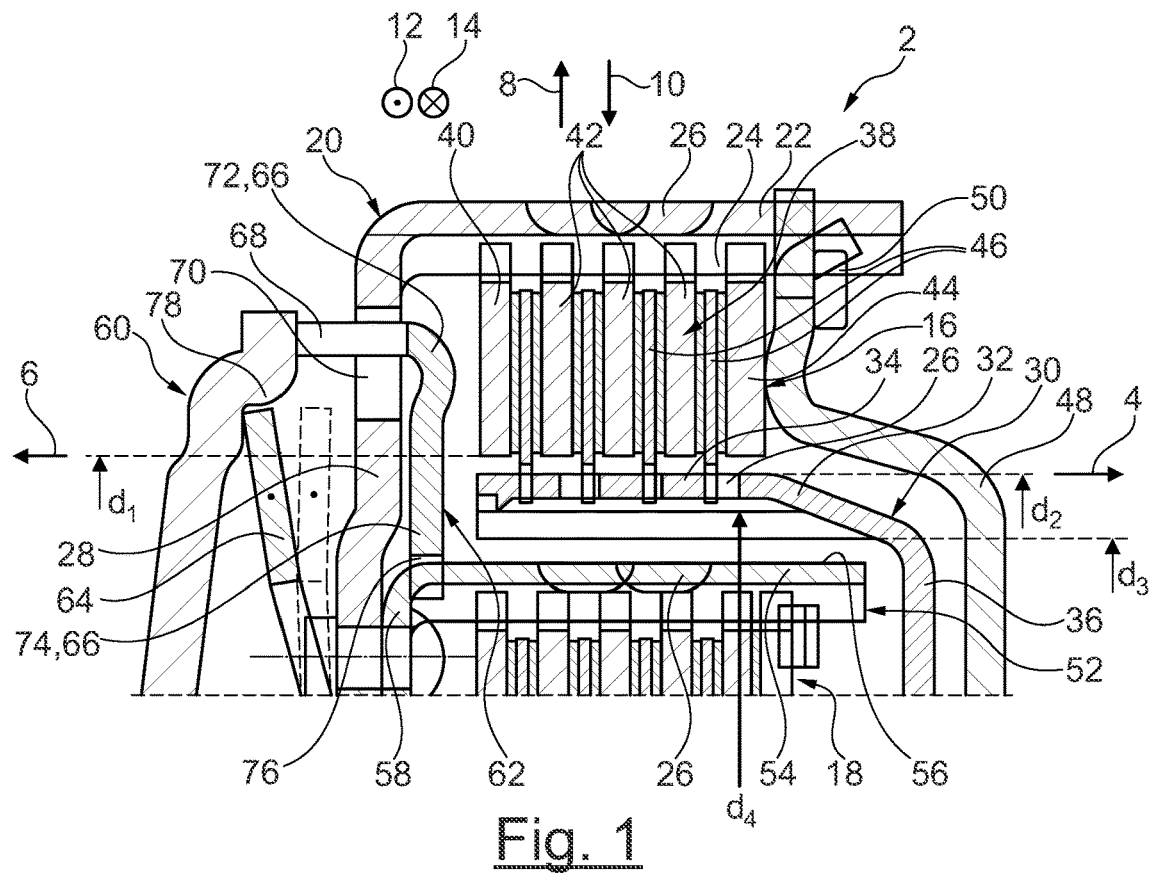
FIG. 1 shows a partial side view of a first embodiment of a clutch device in a cut-away depiction.
Figure 2:
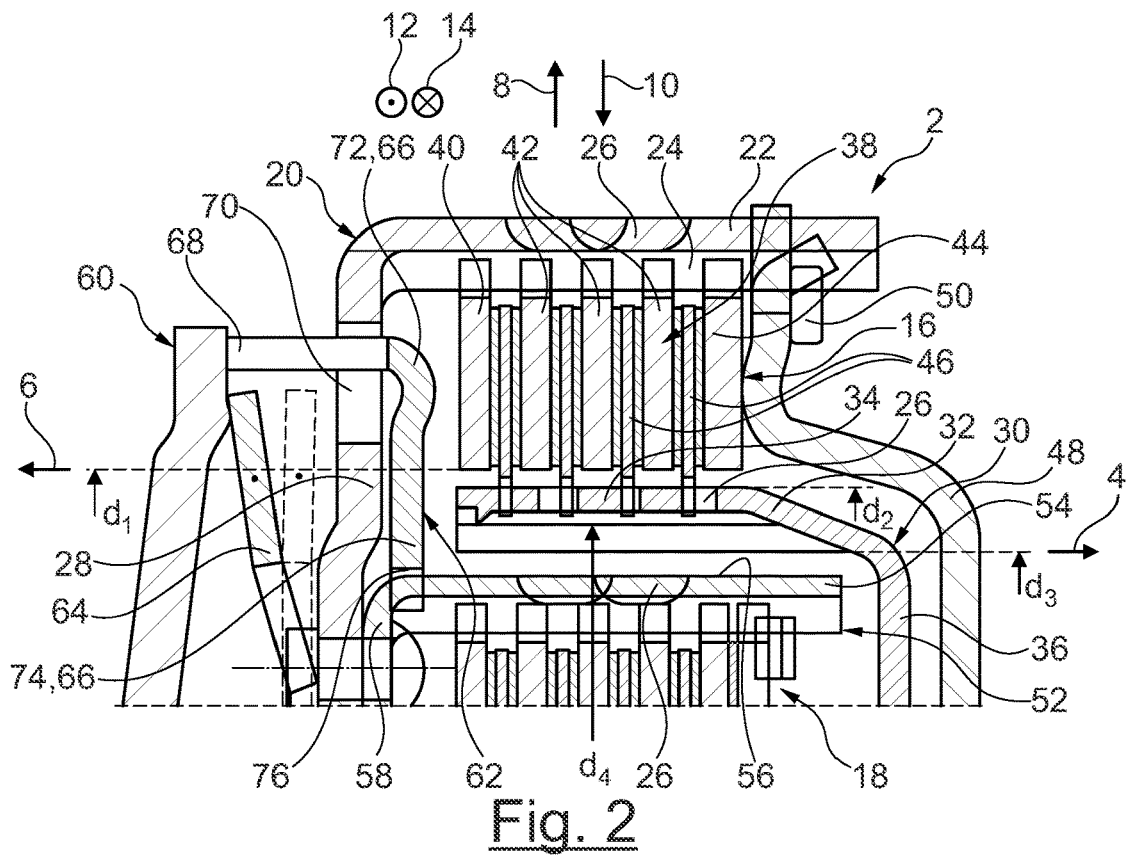
FIG. 2 shows a partial side view of a second embodiment of a clutch device in a cut-away depiction.

FIGS. 1 and 2 show different embodiments of a clutch device 2, wherein the two clutch devices 2 initially have the shared structure described in more detail in the following.

The clutch device 2 is designed as a dual clutch device. To be precise, the clutch device 2 is a concentric dual clutch device. In the figures, the mutually opposite axial directions 4, 6, the mutually opposite radial directions 8, 10 and the mutually opposite circumferential directions 12, 14 are indicated by means of corresponding arrows, wherein the clutch device 2 is rotatable about an axis of rotation (not shown in the figures) extending in the axial directions 4, 6.

The clutch device 2 has a wet-running first multiple disc clutch 16 and a wet-running second multiple disc clutch 18 arranged nested in the radial direction 8, 10 to form a clutch device 2 in the form of a concentric dual clutch device. The first multiple disc clutch 16 has a first multiple disc carrier 20 designed as an outer multiple disc carrier. The first multiple disc carrier 20 has a substantially tubular multiple disc carrier section 22 on the side pointing inward in the radial direction 10 of which a gearing 24 is designed. Liquid passage openings 26 are further designed in the multiple disc carrier section 22. In the axial direction 6, a wall 28 substantially extending in the radial direction 8, 10 is connected to the multiple disc carrier section 22, said wall likewise forming a radial supporting section for the first multiple disc carrier 20 to support said multiple disc carrier in the radial direction 8, 10. The wall 28 extends inward in the radial direction 10 starting from the multiple disc carrier section 22. The first multiple disc clutch 16 additionally has a second multiple disc carrier 30, wherein the second multiple disc carrier 30 has a tubular multiple disc carrier section 32 having a gearing 34 pointing outward in the radial direction 8 and a radial supporting section 36 that extends inward in the radial direction 10 starting from the end of the multiple disc carrier section 32 pointing in the axial direction 4 to support the second multiple disc carrier 30 in the radial direction 8, Liquid passage openings 26 are also designed in the multiple disc carrier section 32 of the second multiple disc carrier 30.

A multiple disc pack 38 of the first multiple disc clutch 16 is arranged between the multiple disc carrier sections 22, 32 in the radial direction 8, 10, said multiple disc pack being formed of outer discs 40, 42, 44 and inner discs 46 following one another alternately in the axial direction 4, 6. The outer disc 40 forms the end disc on the side of the multiple disc pack 38 pointing in the axial direction 6, while the outer disc 44 forms the end disc 44 of the multiple disc pack 38 pointing in the axial direction 4. While an operating power can be applied to the outer disc 40 by the second power transmission element described later in more detail, the outer disc 44 is or can be supported on the first multiple disc carrier 20 in the axial direction 4, wherein this is achieved indirectly via a clutch disc 48 in releasable rotary drive connection with the multiple disc carrier section 22 of the first multiple disc carrier 20 and is or can be supported on the multiple disc carrier section 22 in the axial direction 4 via a retaining ring 50. A motor torque is introduced into the clutch device 2 via the clutch disc 48, so that the first multiple disc carrier 20 is also the input side of the clutch device 2.

The outer discs 40, 42, 44 are designed as discs or steel discs without a friction layer, while the inner discs 46 are designed as friction layer discs that are provided with a friction layer on both sides. It can also be seen from the figures that the outer discs 40, 42, 44 have an outer gearing that meshes with the gearing 24. The outer disc 40 in the form of the end disc has an inner diameter $d_1$. The multiple disc carrier section 32 of the second multiple disc carrier 30 has an outer diameter $d_2$ and additionally an inner diameter $d_3$. The gearing 34 of the multiple disc carrier section 32 additionally has a gearing foot diameter $d_4$.

The second multiple disc clutch 18 has a first multiple disc carrier 52 formed as an outer multiple disc carrier and also forming the input side of the second multiple disc clutch 18, wherein the first multiple disc carrier 52 is connected to the wall 28 of the first multiple disc carrier 20 of the first multiple disc clutch 16 in the axial direction 6 for this purpose in a manner fixed against rotation. The first multiple disc carrier 52 has a multiple disc carrier section 54 having, depending on manufacture, not only an inner gearing on its side pointing inward in the radial direction 10, but also a gearing 56 on its side pointing outward in the radial direction 8, and thus an outer gearing 56 on the tubular disc carrier section 54. The supporting section 58 of the first multiple disc carrier 52 following the multiple disc carrier section 54 in the axial direction 6 and extending inward in the radial direction 8 is—as already previously indicated—connected to the wall 28 of the first multiple disc carrier 20 of the first multiple disc clutch 16 in a manner fixed against rotation, here for example via a seam connection. Liquid passage openings 26 are also designed in the multiple disc carrier section 54.

Two power transmission elements are provided, specifically a first power transmission element 60 and a second power transmission element 62, to be able to apply an operating power to the multiple disc pack 38. The first power transmission element 60 is arranged on a first axial side of the wall 28 facing away from the multiple disc pack 38, specifically next to the wall 28 in the axial direction 6. By contrast, the second power transmission element 62 is substantially arranged on a second axial side of the wall 28 facing the multiple disc pack 38, specifically next to the wall 28 in the axial direction 4. The first power transmission element 60 extends at least substantially in the shape of a disc or annular disc in the radial direction 8, 10 and is designed as a sheet metal part. An operating power acting in the axial direction 4 can be applied inward in the radial direction 10 to the first power transmission element 60 by an operating device (not depicted). The operating device is preferably a hydraulic operating device, for example a corresponding piston-cylinder arrangement.

The first power transmission element 60 is pre-tensioned in the output position shown in the figures via a return spring 64, here a disc spring. The return spring 64 also serves to return the first power transmission element 60, wherein the return spring 64—like the first power transmission element 60 itself—is arranged on the first axial side of the wall 28 and thus next to the wall 28 in the axial direction 6. As can be seen from the figures, the return spring 64 is or can be supported on the wall 28 in the axial direction 4 and on the first power transmission element 60 in the axial direction 6.

The second power transmission element 62 has an annular or annular-disc-shaped application section 66 designed in a continuous course in the circumferential direction 12, 14. The second power transmission element 62 additionally has operating fingers 68 extending substantially in the axial direction 4, 6 that are arranged equally distributed on the application section 66 in the circumferential direction 12, 14 and extend in the axial direction 6 starting from the application section 66. While the application section 66 is arranged completely on the second axial side of the wall 28, and thus next to the wall 28 in the axial direction 4, the operating fingers 68 of the second power transmission element 62 extend through recesses 70 in the wall 28 to interact with the first power transmission element 60 on the first axial side or to be supported on the latter in the axial direction 6.

The application section 66 and the operating fingers 68 of the second power transmission element 62 are designed as one part with one another, wherein the second power transmission element 62 is a one-part sheet metal part. The free ends of the operating fingers 68 pointing in the axial direction 6 could theoretically be permanently fixed to the first power transmission element 60, but with regard to simplified and precise manufacturing, it is preferred if the operating fingers 68 are or can be releasably supported on the first power transmission element 60, as shown in the figures. Both the recesses 70 in the wall 28 and the operating fingers 68 are arranged completely flush with the multiple disc pack 38 in the axial direction 4, 6 to enable the operating power to be transferred to the multiple disc pack 38 via the two power transmission elements 60, 62 as directly as possible.

As already previously indicated, the operating fingers 68 extend substantially in the axial direction 4, 6, wherein the application section 66, more specifically a front radial section 72 of the application section 66 is connected to the operating fingers 68 in the axial direction 4. The front radial section 72 or the application section 66 as a whole does not protrude outward in the radial direction 8 over the operating fingers 68. The operating fingers 68 are arranged completely flush with the application section 66 or the front radial section 72 of the application section 66 in the axial direction 4. This applies correspondingly to the clearances designed between the operating fingers 68 in the circumferential direction 12, 14. The application section 66 is thus arranged flush with the specified clearances in the axial direction 4, 6, wherein the application section 66 completely covers the clearances in the axial direction 4, 6.

The application section 66 protrudes inward in the radial direction 10 over the operating fingers 68. The front radial section 72 of the application section 66 is designed protruding or domed in the axial direction 4, and thus in the direction of the multiple disc pack 38, while a rear radial section 74 of the application section 66 connected to the front radial section 72 inward in the radial direction 10 is set back in the axial direction 6 in relation to the front radial section 72 of the application section 66. The rear radial section 74 extends substantially in the radial directions 8, 10 and is thus substantially annular disc-shaped. The rear radial section 74 is also arranged in the axial direction 4, 6 flush with the multiple disc carrier section 32 of the second multiple disc carrier 30 of the first multiple disc clutch 16 and further inward than the front radial section 72 in the radial direction 10.

In the design of the clutch devices 2 previously described, a liquid, i.e. a cooling and/or lubricating means, for example in the form of an oil, flows in one of the circumferential directions 12, 14 outward in the radial direction 8 due to the rotation of the clutch device 2. The liquid thus flows from inside in the radial direction 8 through the liquid passage openings 26 in the multiple disc carrier section 54 of the second multiple disc clutch 18 into the annular chamber formed between the multiple disc carrier section 54 and the multiple disc carrier section 32 in the radial direction 8, 10. From there, the liquid flows further outward in the radial direction 8 through the liquid passage openings 26 in the multiple disc carrier section 32, between the discs 40, 42, 44, 46 of the multiple disc pack 38 and via the liquid passage openings 26 into the multiple disc carrier section 22. A part of the liquid additionally flows out of the annular chamber between the multiple disc carrier section 54 and the multiple disc carrier section 32, also in the axial direction 6, past the multiple disc carrier section 32 and further outward in the radial direction 8. The application section 66 protruding inward in the radial direction 10 over the operating fingers 68 keeps this liquid back such that it can be fed to the multiple disc pack 38 without the occurrence of a particularly large loss of liquid through the recesses 70 in the wall 28.

For this purpose, the application section 66 extends in the radial direction 10 at least up to the inner diameter $d_1$ of an outer disc 40, 42, 44, preferably up to the inner diameter $d_1$ of the outer disc 40 designed as an end disc and beyond the specified inner diameter $d_1$. In the embodiments according to FIGS. 1 and 2, the application section 66 extends even further inward in the radial direction 10 to generate an even better cooling and/or lubricating effect for the multiple disc pack 38 via the liquid that has been held back. The application section 66 thus extends at least up to the outer diameter d 2 of the multiple disc carrier section 32 of the second multiple disc carrier 30 for the inner discs 46 of the multiple disc pack 38 and further. To improve the effect described even further, the application section 66 further extends inward in the radial direction 10 at least up to the gearing foot diameter d 4 of the gearing 34 of the multiple disc carrier section 32 of the second multiple disc carrier 30 and further. To improve the effect described even further, the application section 66 further extends inward in the radial direction 10 at least up to the inner diameter d 3 of the multiple disc carrier section 32 of the second multiple disc carrier 30 and further to be at least partially arranged flush with the annular chamber designed between the multiple disc carrier section 54 and the multiple disc carrier section 22 in the axial direction 4, 6.

The application section 66 or its rear radial section 74 has radial ledges 76 protruding in the radial direction 10, which extend into the gearing 56 of the multiple disc carrier section 54 of the first multiple disc carrier 52 of the second multiple disc clutch 18 in order to also hinder or completely prevent an axial flow of liquid in the axial direction 6 behind the application section 66 of the second power transmission element 62 in the region of the tooth clearances of the gearing 56. The radial ledges 76 themselves can form a gearing, in which one tooth is preferably provided per tooth clearance of the gearing 56. Thanks to the radial ledges 76, the liquid can be held back and fed to the multiple disc pack 38 even more effectively. The radial ledges 76 extend into the gearing 56 while generating an indirect rotary drive connection between the wall 28 and the second power transmission element 62, wherein this is achieved with a permanent spacing from the operating fingers 68 in the circumferential direction 12 and 14 from a corresponding edge of the recesses 70. The operating fingers 68 are thus relieved of load, as they do not have to generate a rotary drive connection between the second power transmission element 62 and the wall 28 because this is already effected via the radial ledges 76 in rotary drive engagement with the multiple disc carrier section 54.

The difference between the embodiment according to FIG. 1 and the embodiment according to FIG. 2 is substantially in the design of the return spring 64 and the first power transmission element 60. In the first embodiment according to FIG. 1, the first power transmission element 60 has a continuous collar or ledge 78 on which the return spring 64 in the form of the disc spring can be or is supported in the radial direction 8 while centering the same. Contrastingly, in the second embodiment according to FIG. 2, such a ledge or collar 78 is not required, whereby the manufacture of the first power transmission element 60 is significantly simplified. Instead, the return spring 64 designed as a disc spring is or can be supported outward in the radial direction 8 on the operating fingers 68 extending in the axial direction 4, 6 and already present while centering the same.

LIST OF REFERENCE NUMERALS 2 clutch device
4 axial direction
6 axial direction
8 radial direction
10 radial direction
12 circumferential direction
14 circumferential direction
16 first multiple disc clutch
18 second multiple disc clutch
20 first multiple disc carrier
22 multiple disc carrier section
24 gearing
26 liquid passage opening
28 wall
30 second multiple disc carrier
32 multiple disc carrier section
34 gearing
36 radial supporting section
38 multiple disc pack
40 outer disc
42 outer disc
44 outer disc
46 inner disc
48 clutch disc
50 retaining ring
52 first multiple disc carrier
54 multiple disc carrier section
56 gearing
58 supporting section
60 first power transmission element
62 second power transmission element
64 return spring
66 application section
68 operating finger
70 recess
72 front radial section
74 rear radial section
76 radial ledge
78 collar/ledge
$d_1$ inner diameter
$d_2$ outer diameter
$d_3$ inner diameter
$d_4$ gearing foot diameter

The invention claimed is:

1. A clutch device having a wet-running multiple disc clutch that has a first multiple disc carrier, a second multiple disc carrier, and a multiple disc pack assigned to the first and second multiple disc carrier, a first power transmission element on a first axial side of a wall facing away from the multiple disc pack, and a second power transmission element on a second axial side of the wall facing the multiple disc pack for applying an operating power to the multiple disc pack, wherein the second power transmission element has an application section and operating fingers that extend through recesses in the wall to interact with the first power transmission element on the first axial side, and wherein the application section protrudes inward in the radial direction over the operating fingers, wherein the application section has radial ledges on the application section extending into a gearing on a multiple disc carrier section of a second multiple disc clutch of the clutch device arranged nested with the multiple disc clutch in the radial direction.

2. The clutch device according to claim 1, wherein the application section extends inwards in the radial direction starting from the operating fingers at least up to an inner diameter ($d_1$) of at least one outer disc of the multiple disc pack or over the inner diameter ($d_1$) of the at least one outer disc, or at least up to a gearing foot diameter ($d_4$) of a gearing of a multiple disc carrier section of the second multiple disc carrier for inner discs of the multiple disc pack or further.

3. The clutch device according to claim 1, wherein the radial ledges extend into the gearing while generating an indirect rotary drive connection between the wall and the second power transmission element.

4. The clutch device according to claim 3, wherein the operating fingers are permanently spaced in the circumferential direction from an edge of the recesses.

5. The clutch device according to claim 1, wherein the application section has a rear radial section set back in the axial direction in relation to a front radial section of the application section.

6. The clutch device according to claim 5, wherein the rear radial section is arranged flush with a multiple disc carrier section of the second multiple disc carrier in the axial direction, and/or wherein the front radial section is designed protruding or domed in the direction of the multiple disc pack.

7. The clutch device according to claim 1, wherein the application section does not extend outward over the operating fingers in the radial direction, and/or the operating fingers are arranged completely flush with the application section in the axial direction.

8. The clutch device according to claim 1, wherein the application section is arranged in the axial direction flush with clearances that are designed between the operating fingers in the circumferential direction.

9. The clutch device according to claim 1, wherein the recesses in the wall and/or the operating fingers are arranged flush with the multiple disc pack in the axial direction, and/or the application section is designed in a continuous course in the circumferential direction, and/or the first multiple disc carrier has a supporting section extending in the radial direction that forms the wall and/or the wall is formed from a wall connecting the first multiple disc carrier to the multiple disc carrier of the second multiple disc clutch.

10. The clutch device according to claim 1, wherein the operating fingers and the application section are designed as one part with each other, and/or the operating fingers are releasably supported on the first power transmission element.

11. The clutch device according to claim 1, wherein a return spring for returning the first power transmission element is provided on the first axial side.

12. The clutch device according to claim 1, wherein the application section extends inwards in the radial direction starting from the operating fingers at least up to an outer diameter ($d_2$) of a multiple disc carrier section of the second multiple disc carrier for inner discs of the multiple disc pack or further.

13. The clutch device according to claim 1, wherein the gearing forms an outer gearing on a tubular multiple disc carrier section.

14. The clutch device according to claim 1, wherein the gearing is designed as one part with an inner gearing for outer discs of the second multiple disc clutch.

15. A clutch device having a wet-running multiple disc clutch that has a first multiple disc carrier, a second multiple disc carrier, and a multiple disc pack assigned to the first and second multiple disc carrier, a first power transmission element on a first axial side of a wall facing away from the multiple disc pack, and a second power transmission element on a second axial side of the wall facing the multiple disc pack for applying an operating power to the multiple disc pack, wherein the second power transmission element has an application section and operating fingers that extend through recesses in the wall to interact with the first power transmission element on the first axial side, and wherein the application section protrudes inward in the radial direction over the operating fingers, wherein the application section extends inwards in the radial direction starting from the operating fingers at least up to an inner diameter ($d_1$) of at least one outer disc of the multiple disc pack or over the inner diameter ($d_1$) of the at least one outer disc, or at least up to a gearing foot diameter ($d_4$) of a gearing of a multiple disc carrier section of the second multiple disc carrier for inner discs of the multiple disc pack or further.

16. The clutch device according to claim 15, wherein the application section has radial ledges on the application section extending into a gearing on a multiple disc carrier section of a second multiple disc clutch of the clutch device arranged nested with the multiple disc clutch in the radial direction; and wherein the radial ledges extend into the gearing while generating an indirect rotary drive connection between the wall and the second power transmission element.

17. A clutch device having a wet-running multiple disc clutch that has a first multiple disc carrier, a second multiple disc carrier, and a multiple disc pack assigned to the first and second multiple disc carrier, a first power transmission element on a first axial side of a wall facing away from the multiple disc pack, and a second power transmission element on a second axial side of the wall facing the multiple disc pack for applying an operating power to the multiple disc pack, wherein the second power transmission element has an application section and operating fingers that extend through recesses in the wall to interact with the first power transmission element on the first axial side, and wherein the application section protrudes inward in the radial direction over the operating fingers, wherein the application section is arranged in the axial direction flush with clearances that are designed between the operating fingers in the circumferential direction.

18. The clutch device according to claim 17, wherein the application section extends inwards in the radial direction starting from the operating fingers at least up to an inner diameter ($d_1$) of at least one outer disc of the multiple disc pack or over the inner diameter ($d_1$) of the at least one outer disc, or at least up to a gearing foot diameter ($d_4$) of a gearing of a multiple disc carrier section of the second multiple disc carrier for inner discs of the multiple disc pack or further.

19. The clutch device according to claim 17, wherein the application section has radial ledges on the application section extending into a gearing on a multiple disc carrier section of a second multiple disc clutch of the clutch device arranged nested with the multiple disc clutch in the radial direction; and wherein the radial ledges extend into the gearing while generating an indirect rotary drive connection between the wall and the second power transmission element.

\* \* \* \* \*